(12) United States Patent
Krüger

(10) Patent No.: US 6,234,552 B1
(45) Date of Patent: May 22, 2001

(54) FASTENING DEVICE FOR SEATS, SEAT BENCHES OR THE LIKE ON THE FLOOR OF A MOTOR VEHICLE OR THE LIKE

(75) Inventor: Norbert Krüger, Essen (DE)

(73) Assignee: Witte-Velbert GmbH & Co. KG, Velbert (DE)

( * ) Notice: Subject to any disclaimer, the term of this patent is extended or adjusted under 35 U.S.C. 154(b) by 0 days.

(21) Appl. No.: 09/511,401

(22) Filed: Feb. 23, 2000

(30) Foreign Application Priority Data

Feb. 23, 1999 (DE) ................................. 199 07 655
Feb. 17, 2000 (DE) ................................. 100 07 303

(51) Int. Cl.[7] ........................................... B60N 2/02
(52) U.S. Cl. ........................ 296/65.03; 296/65.01; 248/503.1
(58) Field of Search .................. 296/65.03, 65.01; 248/503.1; 297/331, 336, 344.1

(56) References Cited

U.S. PATENT DOCUMENTS

| | | | |
|---|---|---|---|
| 4,376,522 | * 3/1983 | Banks | 248/503.1 |
| 5,562,322 | * 10/1996 | Christoffel | 296/65.1 |
| 6,022,166 | * 2/2000 | Rogers, Jr. et al. | 403/322.4 |
| 6,065,804 | * 5/2000 | Tanaka et al. | 297/336 |
| 6,129,324 | * 10/2000 | Blanchard | 248/503.1 |

FOREIGN PATENT DOCUMENTS 19753538    6/1999    (DE) .

* cited by examiner

Primary Examiner—Dennis H. Pedder
Assistant Examiner—Mickki D. Murray
(74) Attorney, Agent, or Firm—Martin A. Farber

(57) ABSTRACT

The invention is a locking device for fastening a vehicle seat to a floor of the vehicle. The device allows both fastening and unfastening via structure that compensates for tolerances and helps ensure a rattle-free connection.

30 Claims, 15 Drawing Sheets

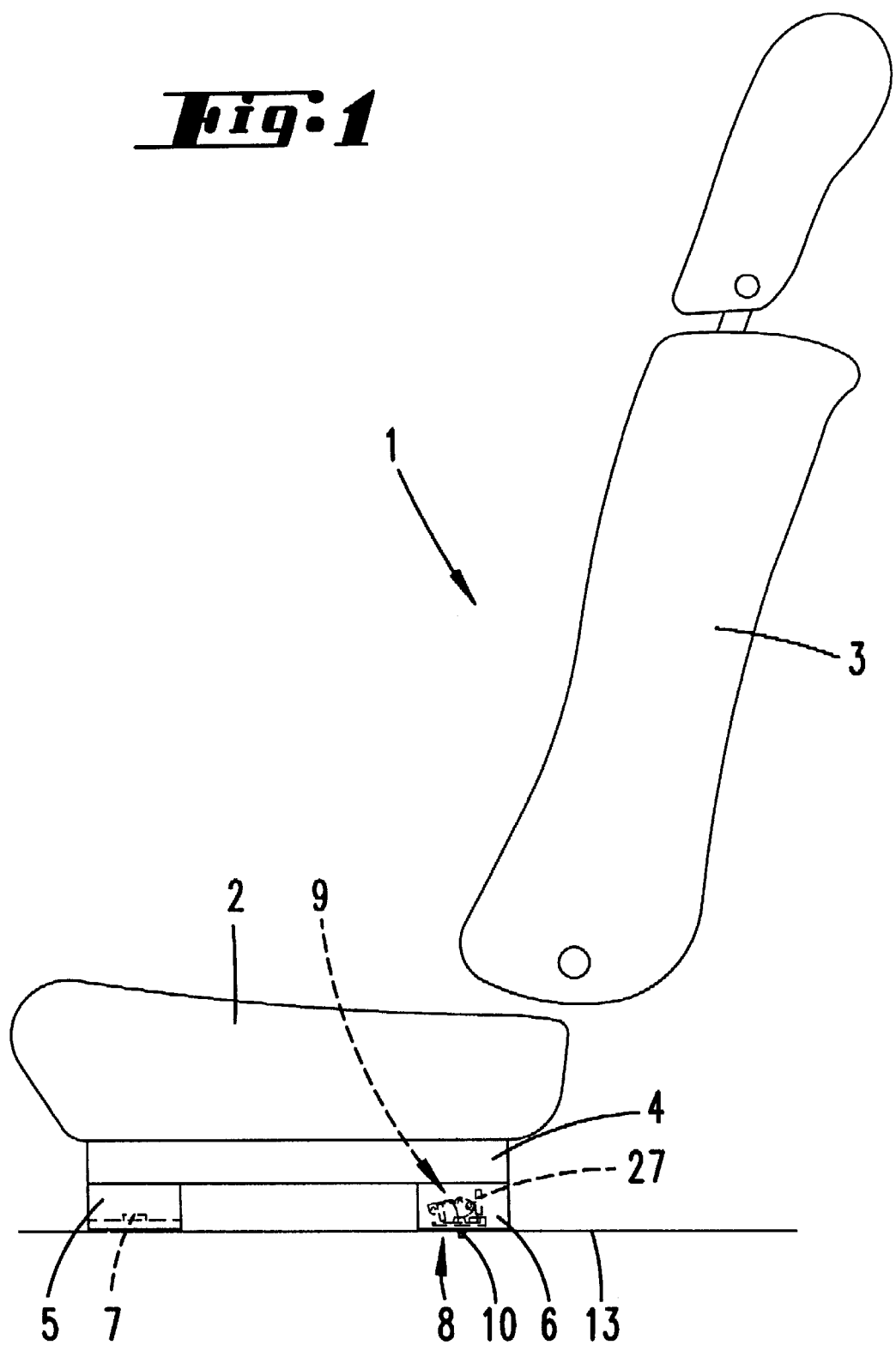

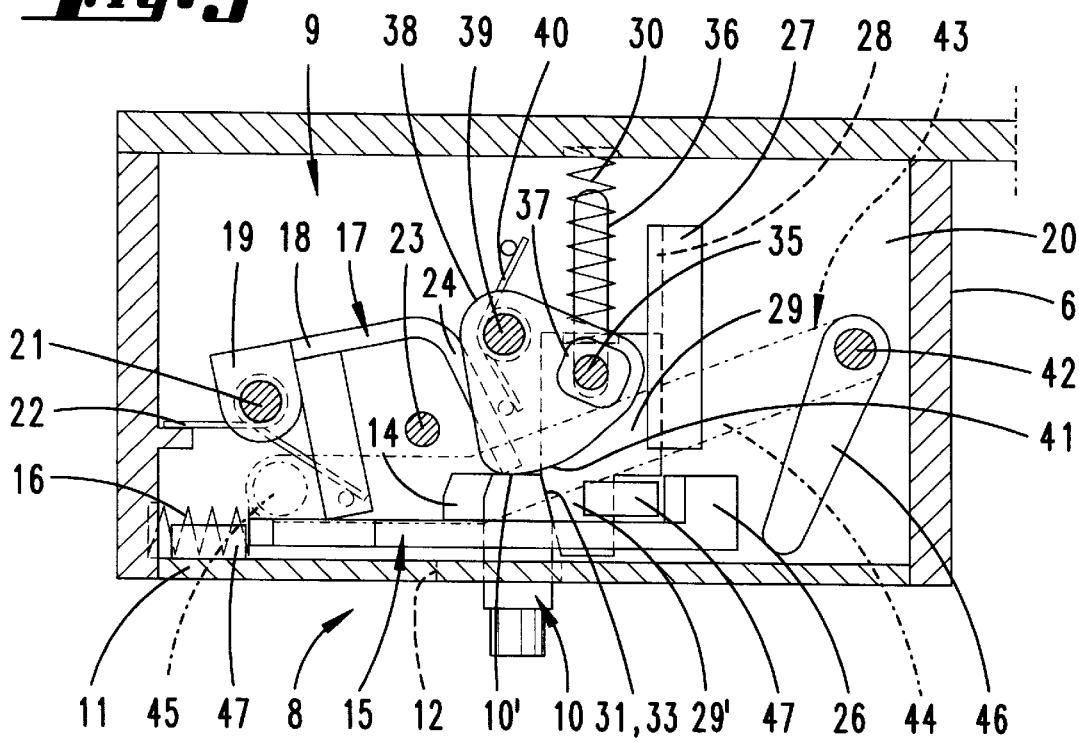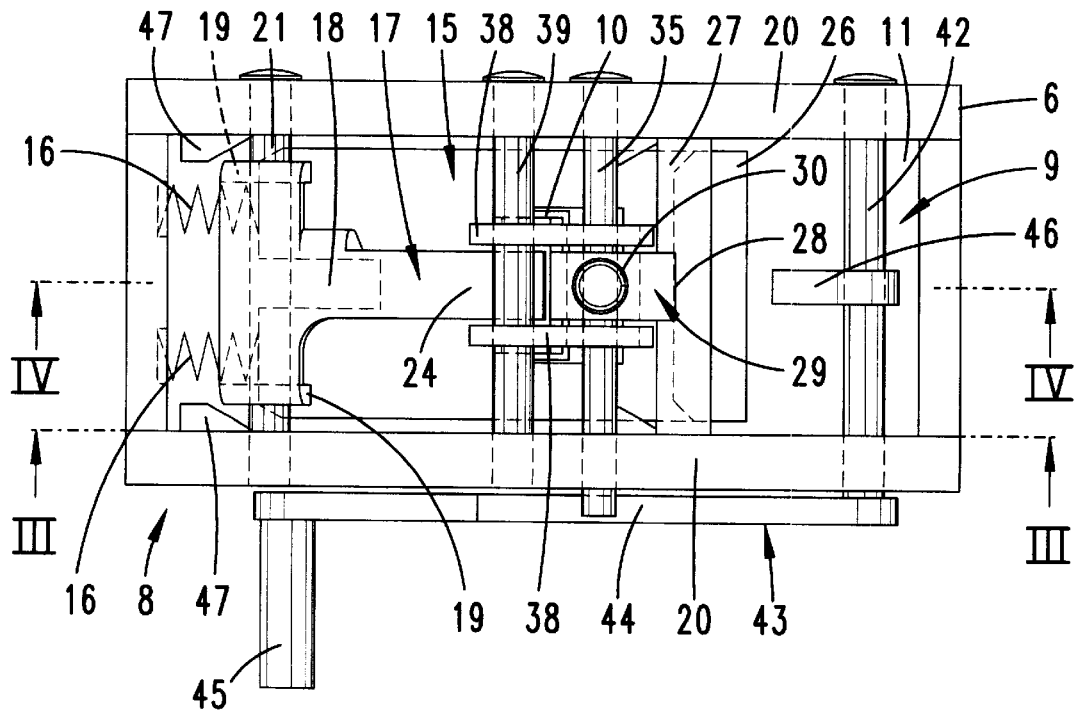

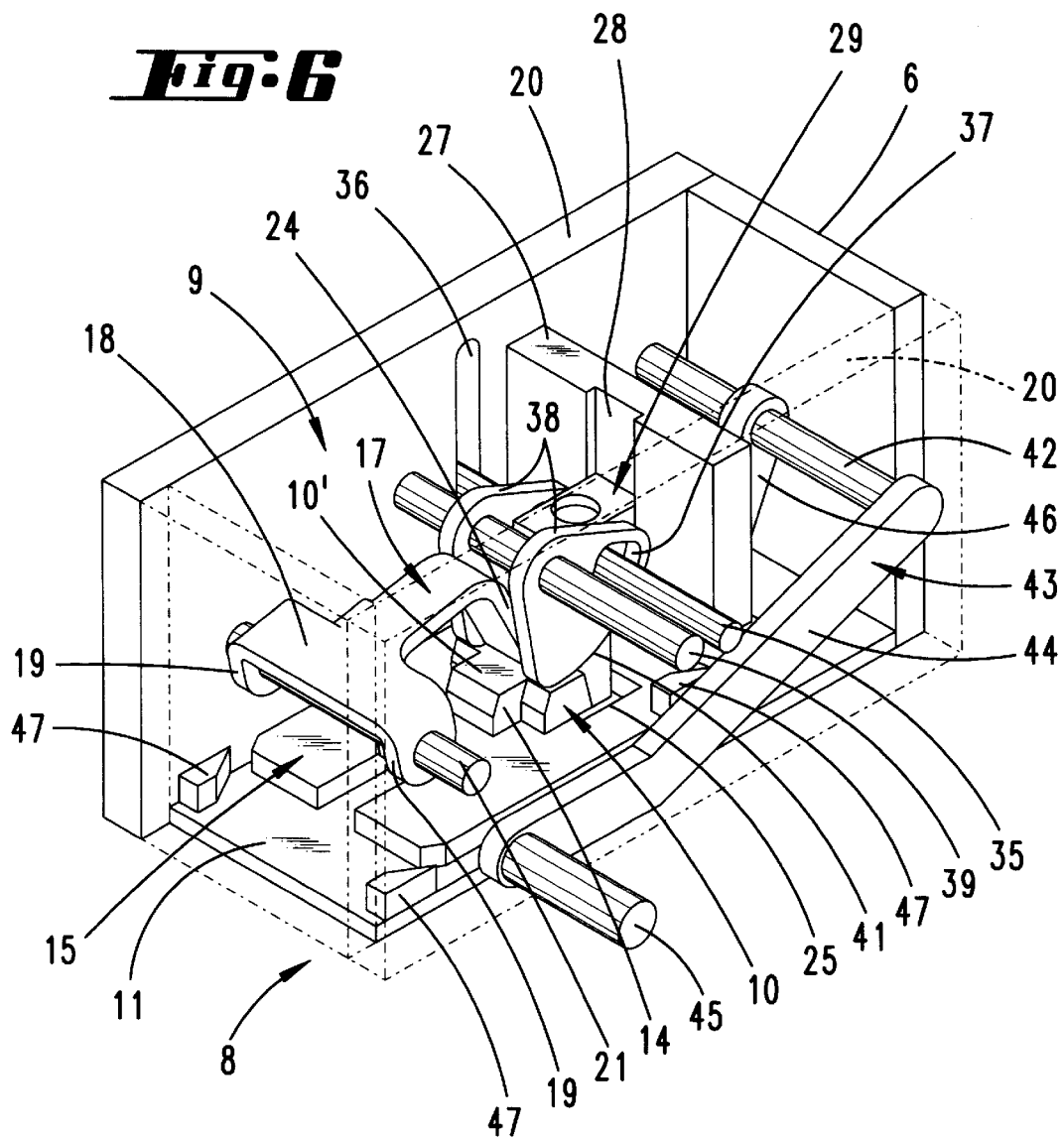

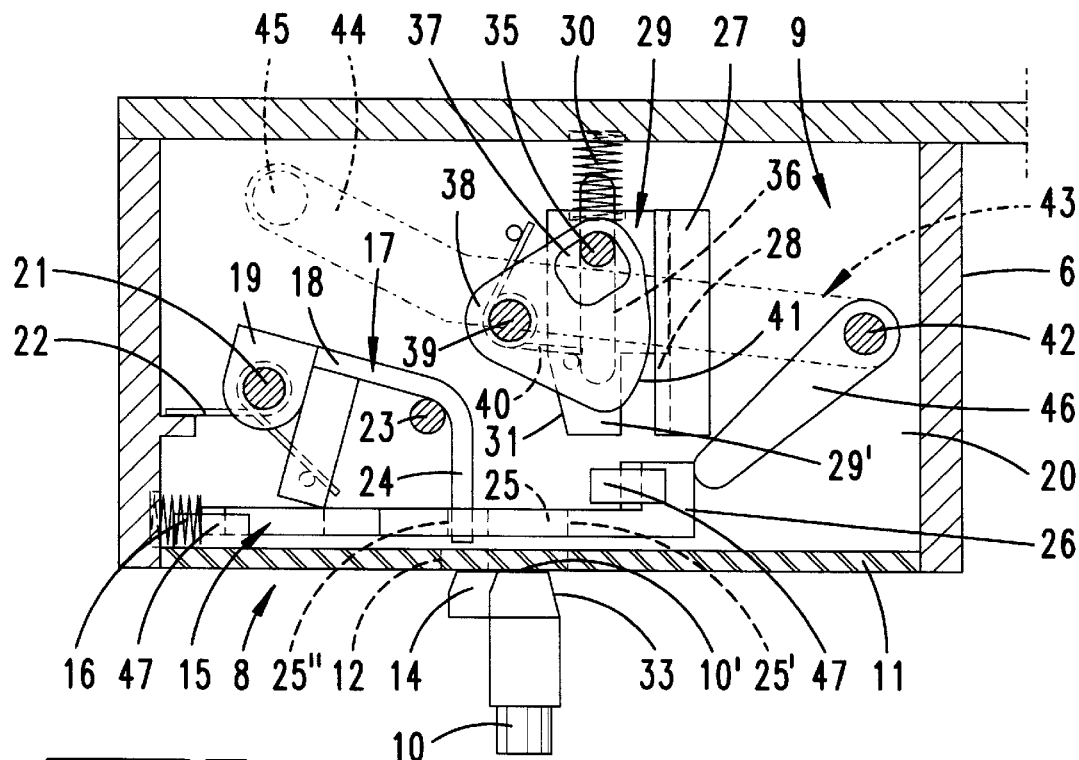
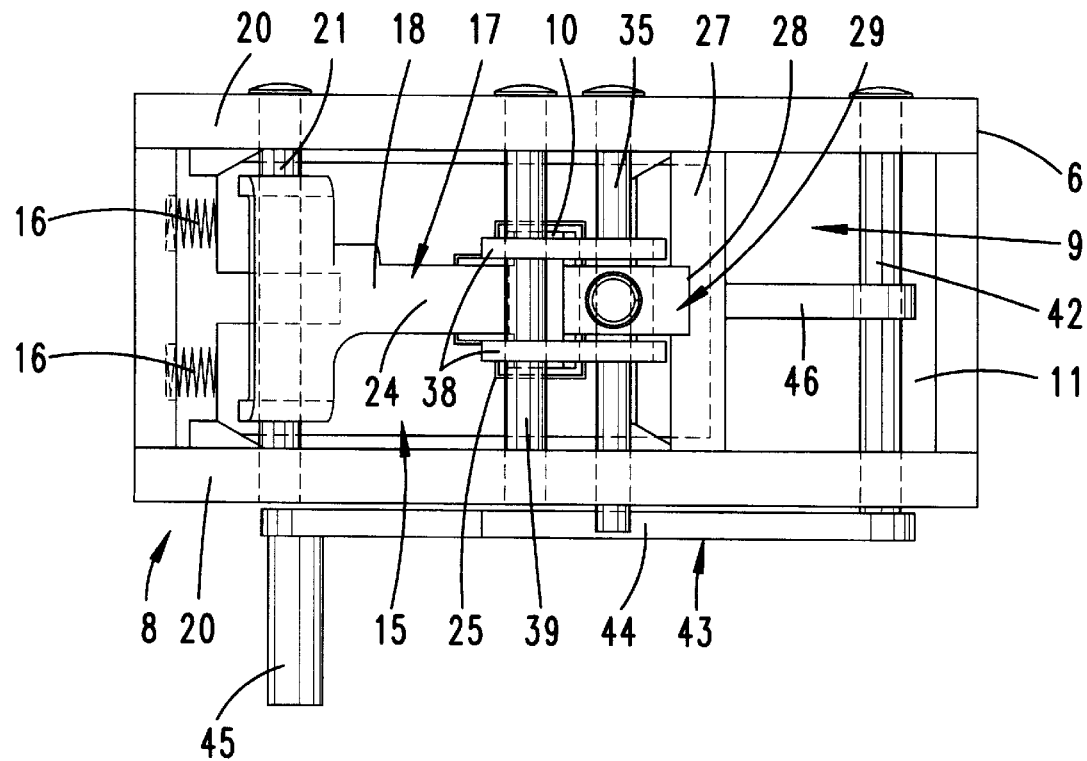

FASTENING DEVICE FOR SEATS, SEAT BENCHES OR THE LIKE ON THE FLOOR OF A MOTOR VEHICLE OR THE LIKE

FIELD AND BACKGROUND OF THE INVENTION

The invention relates to a fastening device for seats, seat benches or the like on the floor of a motor vehicle or the like, with a floor-mounted locking dog with a blocking projection spaced apart from the floor and with a fastener, having a blocking slide with a capture opening for the locking dog, which blocking slide can be displaced, in a manner controlled by means of a trigger, out of an open position into a fastening position, in which it engages under the blocking projection by means of the opening edge.

A fastening device of the above-mentioned type forms the subject matter of a patent application 197 53 538.0, which is not a prior publication, a locking member being provided which holds the blocking slide in the release position during decoupling by positive interengagement. The locking dog, for its part, is provided with a mushroom head which interacts with the blocking slide in the manner of a bayonet-type joint, more specifically by means of actuation of the locking member by a projection on the vehicle floor.

SUMMARY OF THE INVENTION

The subject matter of the invention is based on the object of configuring a fastening device of the introductory-mentioned type in such a way that installation tolerances are compensated for by a large-dimensioned capture opening in the blocking slide and that firm, rattle-free interconnected engagement between the locking dog and the blocking slide is nevertheless achieved.

This object is achieved first of all and essentially in a fastening device of the introductory-mentioned type wherein a clamping member is provided which, in the fastening position, enters the displaced capture opening and wedges against the locking dog.

The significant advantage of the configuration according to the invention is that larger installation tolerances can be compensated for and a stable connection between the fastener on the seat and the locking dog on the vehicle floor can nevertheless be achieved. As soon as the locking dog has passed through the capture opening in the blocking slide, the said opening being larger in relation to the outline of the said dog, the blocking slide returns under spring loading into its blocking position. The clamping member is concomitantly released, moving into a wedging clamping position relative to the locking dog. Here, the clamping member can be supported on that rim edge of the capture opening which lies opposite the opening edge, the blocking slide being held in a clamping position relative to the locking dog, which also excludes return displacement of the blocking slide into its release position. In detail, the clamping member is constructed in such a way that it forms a wedging surface by means of which it acts on a likewise wedge-shaped mating surface of the locking dog. The wedging surface and the mating wedging surface preferably slope at the same angle. Stable fixing of the seat in the second dimension is achieved by virtue of the fact that the wedging portion of the clamping member is plastic-coated and the mating surface of the locking dog forms toothing extending in the direction of displacement. When the wedging surface and the mating wedging surface move up against one another, digging in accordingly occurs, bringing about interconnected engagement transversely to the direction of displacement of the blocking slide. Provision is made for the clamping member to enter the capture opening under spring loading after corresponding displacement of the blocking slide. The clamping member is provided with a stand-by position by being supported on the broad face of the blocking slide in the open position. As soon as the blocking slide is displaced into its blocking position when the locking dog enters the capture opening, the clamping member is deprived of support on the broad face after a corresponding displacement distance, allowing it to enter the capture opening under spring loading and receive support on the mating surface of the locking dog with its wedging surface. To enable the vehicle-mounted fastener to be released from the locking dog, the clamping member can be dragged along out of its clamping position by a pivotable opening lever, the pivoting of which effects displacement of the blocking slide back into the open position. It should furthermore be emphasized that the clamping member is constructed as a clamping slide. The guide for the latter is situated on the fastener housing. Provision is then made for a trigger to sense the end face of the locking dog. After a corresponding entry distance of the locking dog into the fastener, the trigger brings about release of the blocking slide, which moves under spring action into its position of engagement behind the locking dog. To obtain anchoring between the locking dog and the fastener in the third dimension as well, another clamping member is provided and, in the fastening position, this moves up against the end and wedges between the fastener housing and the end of the locking dog. This clamping member is configured as a rotary wedge. The rotary wedge concerned is displaced back out of the clamping position with the clamping slide during opening actuation. This is accomplished by means of a driver pin of the clamping slide, which driver pin projects with clearance through a driver opening in the rotary wedge and is taken along by the opening lever during the opening actuation. The latter accordingly performs a dual function, serving, on the one hand, to displace the blocking slide back and, on the other hand, to take the clamping slide along. To enable this to be accomplished, the blocking slide can be displaced into its open position by a lever arm of the opening lever. The blocking slide is held in this position by means of the trigger in its latching position. The trigger can be configured as a feeler. However, it is also possible to construct the trigger as a pivoted lever. In the latter version, it is advantageous in terms of control that the trigger holds the blocking slide in the open position by engagement in the capture opening. When the seat is placed on the vehicle floor, the locking dog moves the trigger out of the region of the capture opening, after which the blocking slide is released for its displacement into the position in which it engages behind. Finally, an advantageous feature consists in the trigger tensioning the blocking-slide displacement spring during its displacement under the action of the end face of the locking dog.

Another version is characterized by the fact that the blocking slide is displaced into the blocking position by the entry movement of the locking dog into the capture opening. This ensures at all times that the blocking slide enters into engagement with the locking dog, even in the event of stiffness, which can arise, for example, due to soiling etc. In detail, the situation here is such that the forcible displacement of the trigger, which passes through a free travel, is controlled. This means that the displacement of the blocking slide into its locking position takes place only when the trigger has passed through the corresponding free travel. The blocking slide can thus not attempt to move into its blocking position too early. The forcible control is achieved in a simple manner by virtue of the fact that the trigger, which is constructed as a pivoted lever, travels freely in the same direction as the entry movement and, in the process, its spindle is guided in a rotation-inhibited manner in a housing slot which, at the end, forms a pivoting clearance, with the result that a driving arm of the pivoted lever displaces the blocking slide into its blocking position. Only when the spindle has traversed the housing slot and is at the level of the pivoting clearance can the pivoted-lever trigger pivot under the control of the locking dog, simultaneously taking along the blocking slide into its blocking position. For this purpose, the driving arm has a pin which engages in a driver slot extending transversely to the direction of displacement of the blocking slide. The pin/slot control system of the blocking slide is thus one which can be manufactured in an advantageous manner in terms of production technology. To obtain rattle-free locking positions, elastic transverse support of the pin in the driver slot is provided. This can be accomplished, for example, by the wall of the driver slot being elastically padded. A reversal would likewise be possible, with the pin being given rubber-elastic padding arranged concentrically to it. According to the invention, another advantageous feature consists in that the linear displacement is performed against the force of a return spring. The latter performs a dual function by virtue of the fact that it is the spring which loads the clamping member. Tolerances are compensated for in a simple manner in the blocking position by virtue of the fact that the blocking projection forms a slope under which an oblique blocking surface of the blocking slide can engage. To be able to transfer the blocking slide from its blocking position into the open position, a reverse displacement of the blocking slide is required. This takes place against the force of the return spring acting on the trigger. Accordingly, the pivoted-lever trigger pivots, with the result that the spindle moves out of the pivoting clearance into an aligned position with the housing slot. During the pivoting displacement of the pivoted-lever trigger, the feeler arm formed by the trigger lever slides on an oblique end face of the locking dog. This oblique end face falls away in the direction of the blocking projection, this proving advantageous during the pivoting back of the trigger. Finally, it should be emphasized that the return spring is a torsion spring, one leg of which acts on the noncircular spindle of the release lever and the other leg of which acts on the clamping member. Accordingly, a single spring is sufficient for fastening, a factor which contributes to a saving in production costs. This configuration furthermore leads to simplified assembly of the fastening.

BRIEF DESCRIPTION OF THE DRAWINGS

Three exemplary embodiments of the invention are explained below with reference to the Figures of the drawings, in which FIG. 1 shows schematically a seat fastened to the vehicle floor by means of the fastening device according to the invention, FIG. 2 shows, in a detailed representation, a plan view of the fastener, which has entered into interconnected engagement with the locking dog, the illustration relating to the first embodiment, FIG. 3 shows the section along the line III—III in FIG. 2, FIG. 6 shows a perspective illustration of the fastener with the locking dog caught by it, FIG. 7 shows a plan view of the fastener during the opening actuation, FIG. 8 shows an illustration comparable with FIG. 3 but during the opening actuation.

Figure 4:
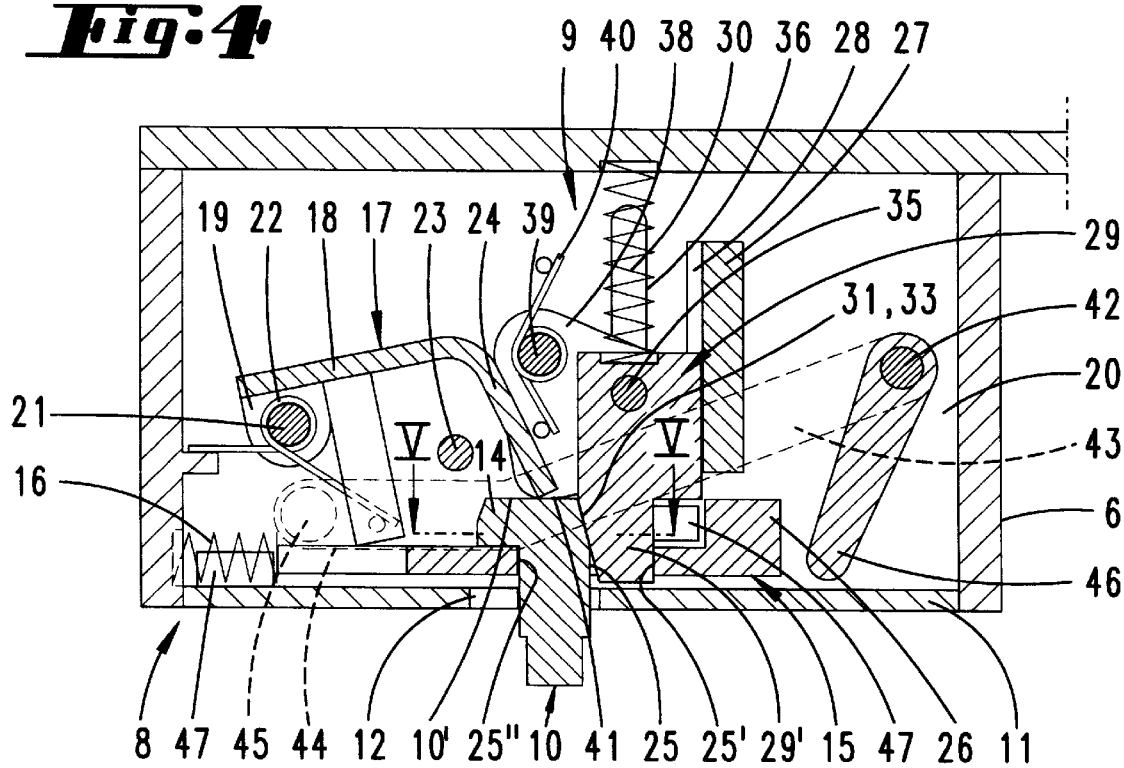
FIG. 4 shows the section along the line IV—IV in FIG. 2.

DETAILED DESCRIPTION OF THE PREFERRED EMBODIMENTS 1 denotes a vehicle seat overall. This has a seat cushion 2 and a back rest 3 associated with the latter in an articulated manner. The seat cushion 2 rests on a supporting frame 4, from which two pairs of parallel feet 5, 6 project downward. The front feet 5 can be associated with studs 7 on the vehicle floor by means of a bayonet joint, for example. To fix the rear area of the vehicle seat 1, i.e. the feet 6, each foot 6 is assigned a fastening device 8. This comprises a fastener 9 built into each foot 6 and a locking dog 10 on the vehicle floor, which interacts with said fastener.

Figure 12:
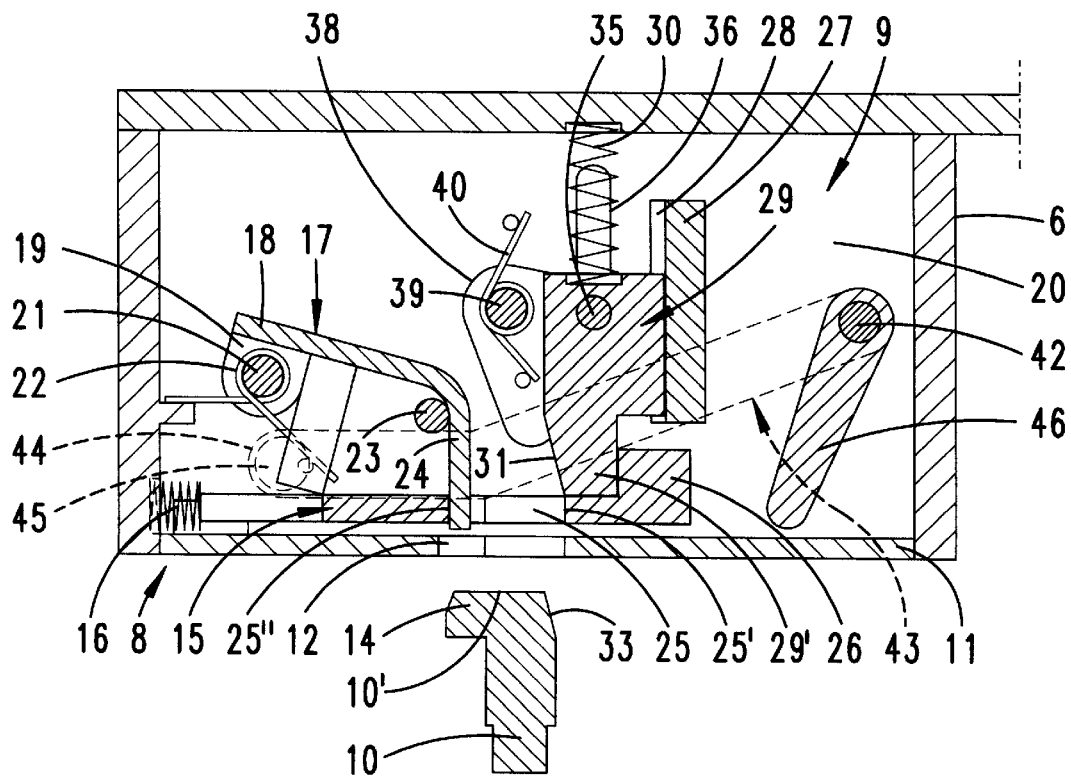
FIG. 12 shows a section comparable with FIG. 4 but relating to the open position of the fastener.
Figure 14:
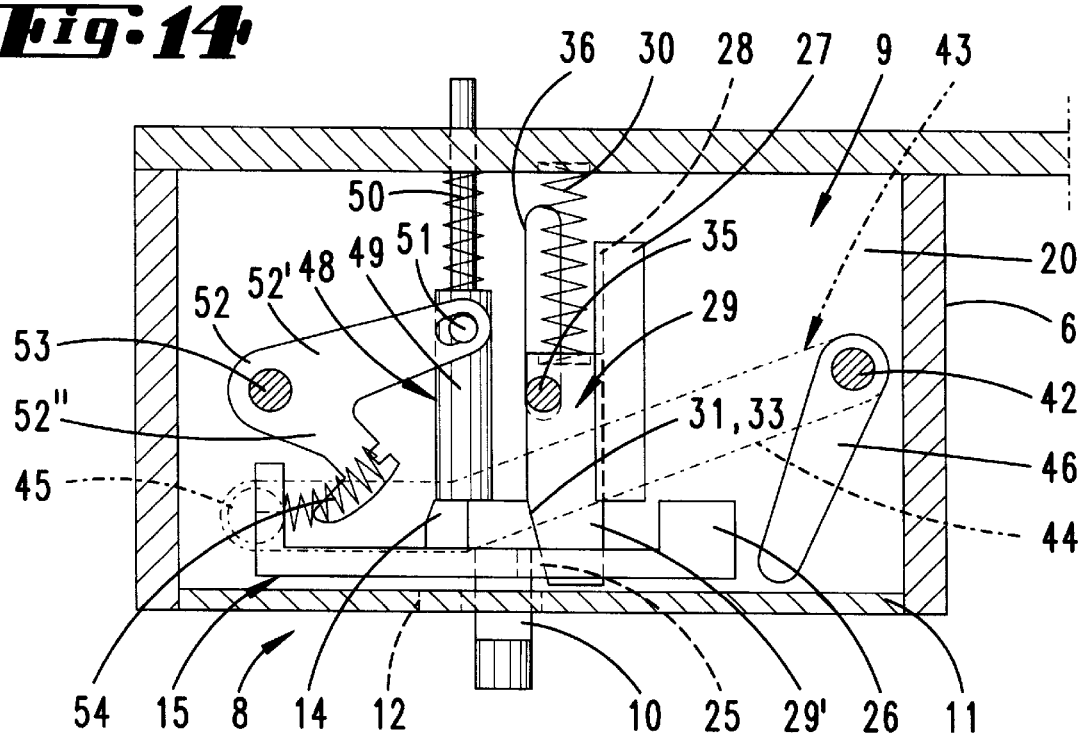
FIG. 14 shows the section along the line IVX—IVX in FIG. 13.
Figure 13:
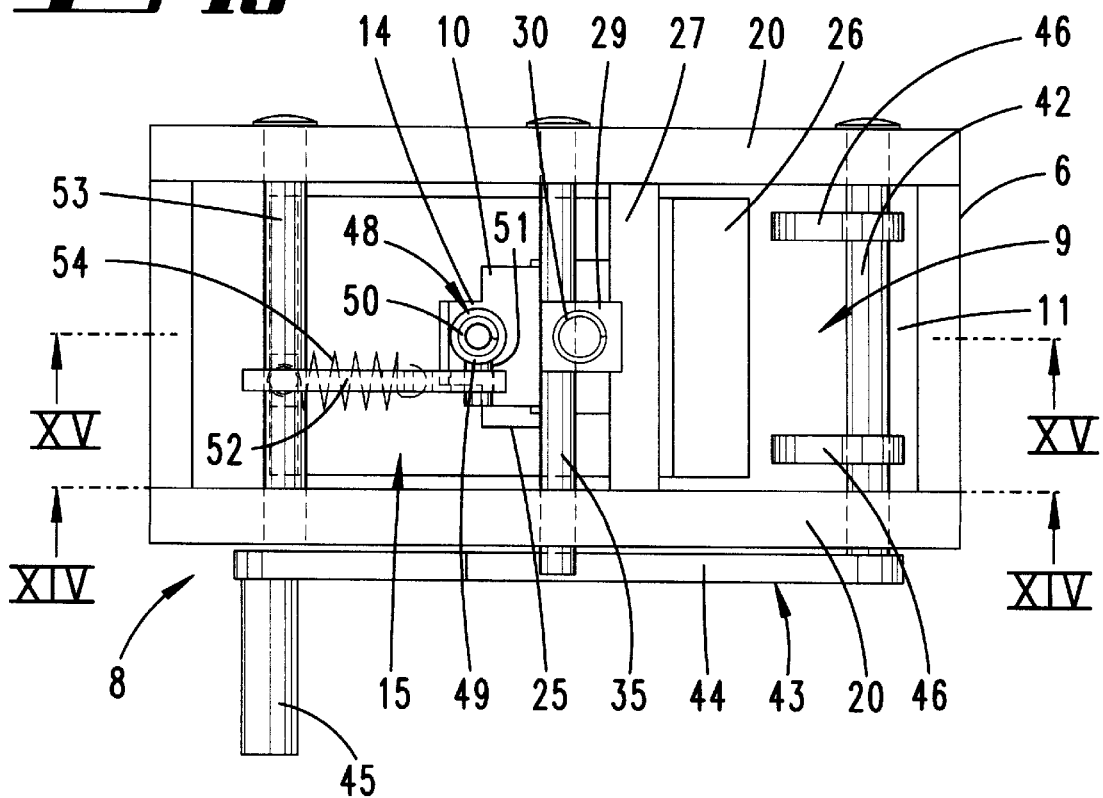
FIG. 13 shows a plan view of the fastener relating to the second embodiment, with the locking dog caught by the fastener.
Figure 15:
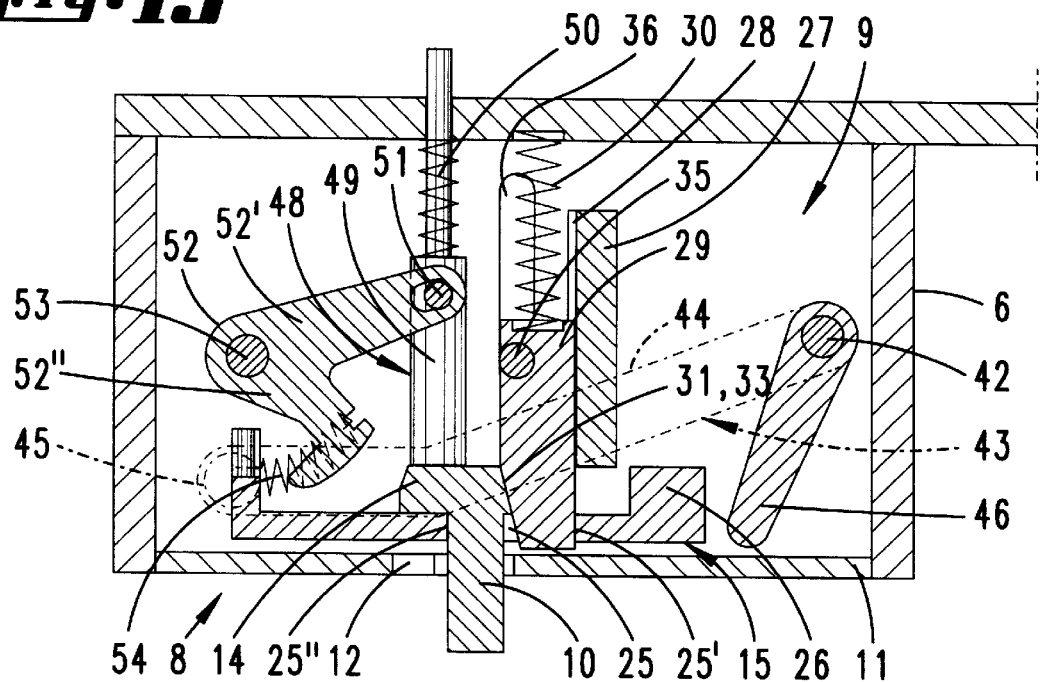
FIG. 15 shows the section along the line VX—VX in FIG. 13.
Figure 16:
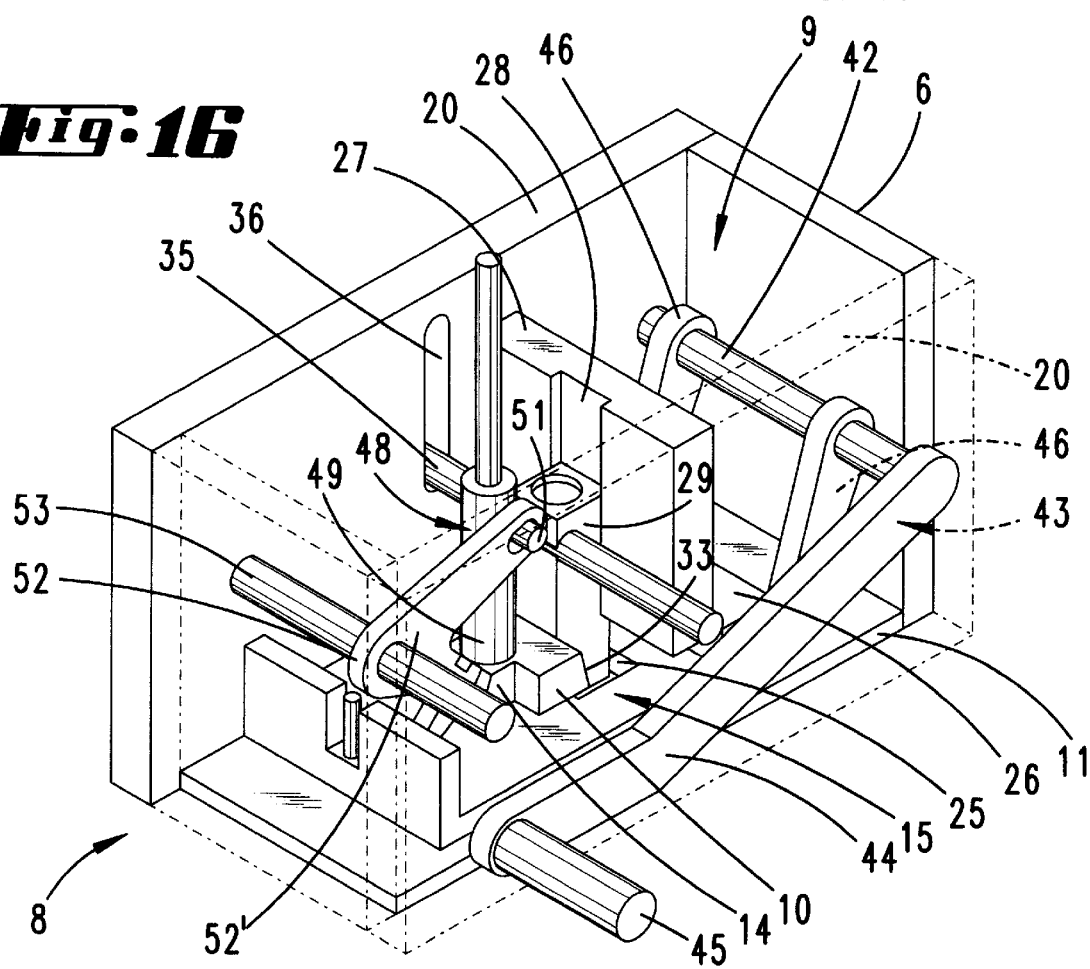
FIG. 16 shows a perspective illustration of this fastener in the position in which it traps the locking dog.

The foot 6 is shaped to form a box-shaped fastener housing. The housing base 11 has an access opening 12 for the locking dog 10. The latter is secured on the floor panel 13 (illustrated schematically in FIG. 1) of a motor vehicle. Projecting from the upper end of the locking dog 10 is a blocking projection 14 which extends parallel to the floor panel 13, the locking dog 10 thus forming approximately a T shape in outline. In its interior, above the housing base 11, the fastener housing accommodates a blocking slide 15 which is guided parallel to said base. Compression springs 16 engage on that end of the blocking slide 15 which points in the direction of travel. The blocking slide 15 is held in its release position by a trigger 17 which, according to the first exemplary embodiment, is configured as a pivoted lever. This pivoted-lever trigger 17 has an angled shape. Bearing tabs 19 emanate from one angle leg 18 of the trigger 17. A bearing journal 21 seated in the housing side walls 20 passes through these tabs. Arranged on this journal is a torsion spring 22 which loads the pivoted-lever trigger 17 in the clockwise direction. The pivoting of the trigger 17 in the clockwise direction is limited by a stop pin 23. In this position, the other angle limb 24 of the pivoted-lever trigger 17 engages in a capture opening 25 in the blocking slide 15 and limits the displacement of the latter caused by the compression springs 16. This assumes that the spring force of the torsion spring 22 is greater than that of the compression springs 16. The capture opening 25 is similar in outline to the locking dog 10 but is larger and is aligned with the locking dog 10, cf. FIG. 12.

Figure 11:
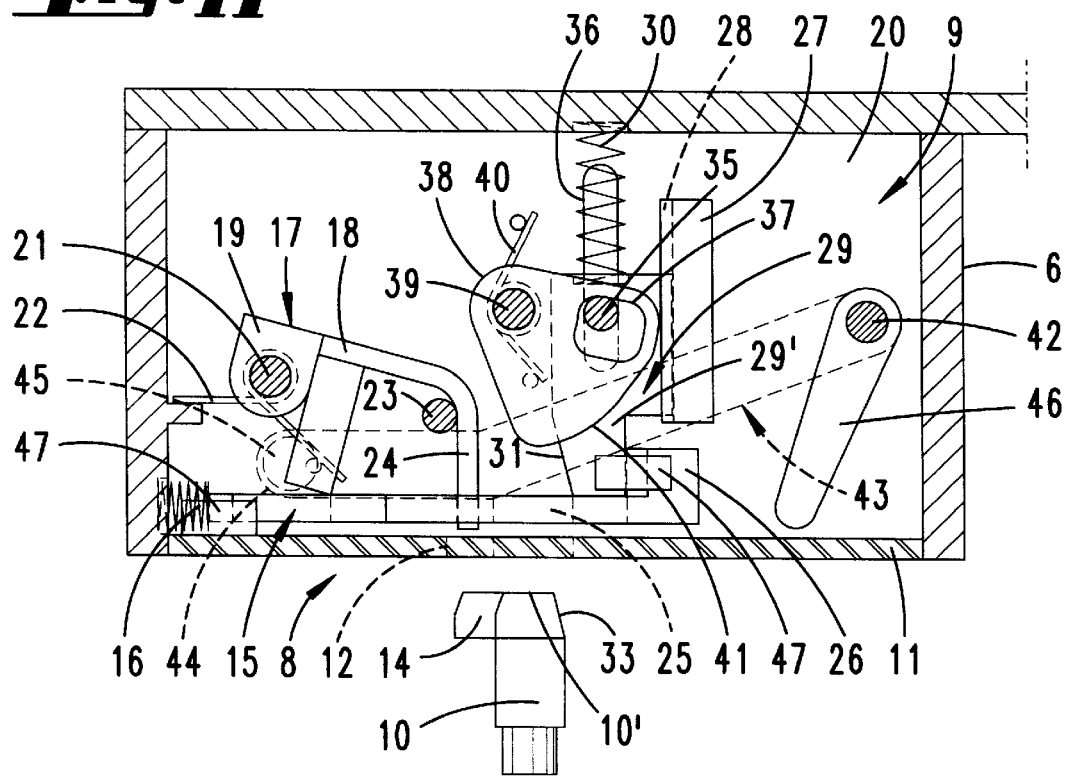
FIG. 11 shows an illustration comparable with FIG. 3, the fastener and the locking dog being separated from one another.

On the other side of the capture opening 25, the blocking slide 15 continues with a transversely oriented supporting beam 26 of larger cross section. Above the latter and supported by the housing side walls 20 is a crossmember 27 which, on the side facing the trigger 17, has a vertically oriented guide groove 28 for a clamping member 29. This clamping member is constructed as a clamping slide. Engaging on its upper face is a compression spring 30 which loads the clamping slide 29 in a downward direction. The downward displacement is limited by the broad face of the blocking slide 15, said face being situated between the supporting beam 26 and the opening edge 25' of the capture opening 25. The angle limb 24 of the pivoted-lever trigger 17, which represents a pushbutton, rests against the opening edge 25" lying parallel to and opposite the opening edge 25', cf. in this regard FIGS. 11 and 12.

Figure 5:
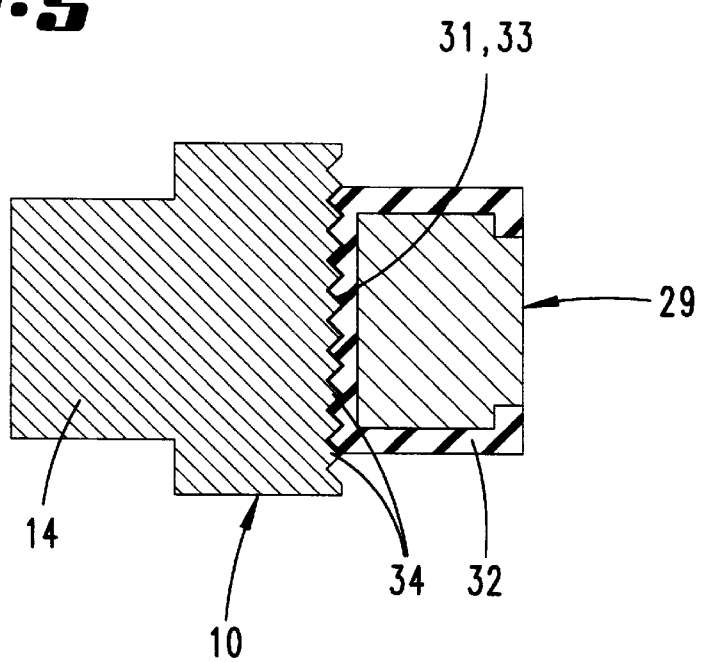
FIG. 5 shows the section along the line V—V in FIG. 4.

On its side facing the angle lever 24, the lower end 29' of the clamping member 29, said end being offset in a step shape, forms a wedging surface 31. The wedging portion, i.e. the lower end 29' of the clamping member 29, is sheathed by a plastic layer 32. This is a plastic which can be pressed in and will recover. Interacting with the plastic-coated wedging portion is a mating surface 33 of the locking dog 10. This mating surface 33 is likewise aligned in the form of a wedge and extends parallel to the wedging surface 31 of the clamping member 29. The mating surface 33 forms toothing 34 which faces in the direction of displacement of the clamping member 29 and by means of which the locking dog 10 digs into the plastic layer 32 in the fastening position in accordance with FIGS. 4 and 5, thereby fixing the fastener 9 and the locking dog 10 relative to one another in the transverse direction.

The clamping member 29 in the form of a clamping slide is penetrated by a coupling pin 35. The ends of the coupling pin, which project beyond the clamping member 29, are guided in vertical slots 36 in the housing side walls 20. The coupling pin 35 passes with clearance through a driver opening 37 in another, double-layer clamping member 38, which is configured as a rotary wedge. The clamping member/rotary wedge 38 is pivoted on a spindle 39 belonging to the fastener housing and is loaded in the clockwise direction by a torsion spring 40 situated on the spindle 39. In the open position of the fastener in accordance with FIGS. 11 and 12, the upper edge of the driver opening 37 acts on the coupling pin 35 and hence limits the pivoting movement of the clamping member/rotary wedge 38. The wedging surface 41 of the clamping member/rotary wedge 38 extends eccentrically to the spindle 39.

The fastener housing also supports an opening lever 43 about a journal 42 supported by the housing side walls 20. This lever has an actuating arm 44 which extends outside the fastener housing, parallel to one housing side wall 20, and has an actuating handle 45 at its free end. Connected to the actuating arm 44 in terms of effect, within the fastener housing, is a lever arm 46 which interacts with the blocking slide 15 or, more precisely, the supporting shoulder 26 of the latter. The actuating arm 44 extends underneath the coupling pin 35 of the clamping slide 29 and hence serves to displace the latter. The opening lever 43 can be acted upon in the clockwise direction by a spring (not illustrated) and its lower position can be limited by a stop.

The following mode of action is obtained: once the front feet 5 of the vehicle seat 1 have entered into interconnected engagement with the stud 7, the rear area of the vehicle seat can be brought into interconnected engagement with the vehicle floor 13. This results in the position shown in FIGS. 11 and 12, in which figures the locking dog 10 is still in front of the entry opening 12 in the housing base 11. As the rear area of the vehicle seat 1 is lowered further, the locking dog 10 enters the entry opening 12 in the housing base 11. As it passes through the entry opening 12, the end face 10' of the locking dog 10 acts on the angle limb 24 of the pivoted-lever trigger 17 and displaces the latter against spring loading. The locking dog 10 then enters the capture opening 25 in the blocking slide 15 and traverses this opening, the trigger 17 being pivoted and thereby releasing the blocking slide 15 for spring-loaded displacement once the blocking projection 14 of the locking dog has moved completely through the capture opening 25. Due to the displacement of the blocking slide 15, the clamping slide 29 loses its support on the broad face, with the result that it moves rapidly under spring loading in the direction of the locking dog 10, the wedging surface 31 of the clamping slide 29 entering into engagement with the toothed mating surface 33 of the locking dog, cf. FIGS. 4 and 5. In this position, the opening edge 25" of the capture opening 25 is supported on the clamping member 29, while the opposite opening edge 25''' of the capture opening 25 is clamped against the locking dog 10 under the projection 14.

As a concomitant of the downward displacement of the clamping slide 29, the coupling pin 35 releases the rotary wedge 38 for spring-induced pivoting, its wedging surface 41 pressing against the end face 10' of the locking dog 10 and hence effecting clamping in the third dimension between the fastener 9 and the locking dog 10.

Installation tolerances between the fastener 9 and the locking dog 10 can accordingly be compensated for by means of a capture opening 25 of relatively large dimensions. Nevertheless, the connection between the fastener and the locking dog does not rattle in the fastened position.

Figure 9:
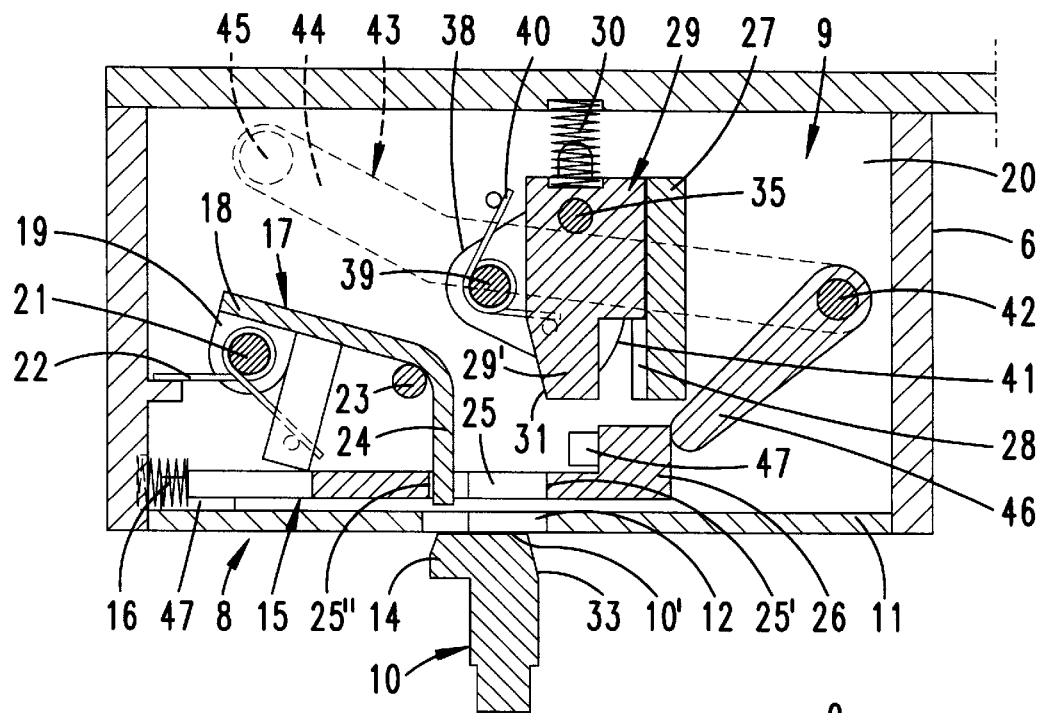
FIG. 9 shows a section comparable with FIG. 4, likewise during the opening actuation.
Figure 10:
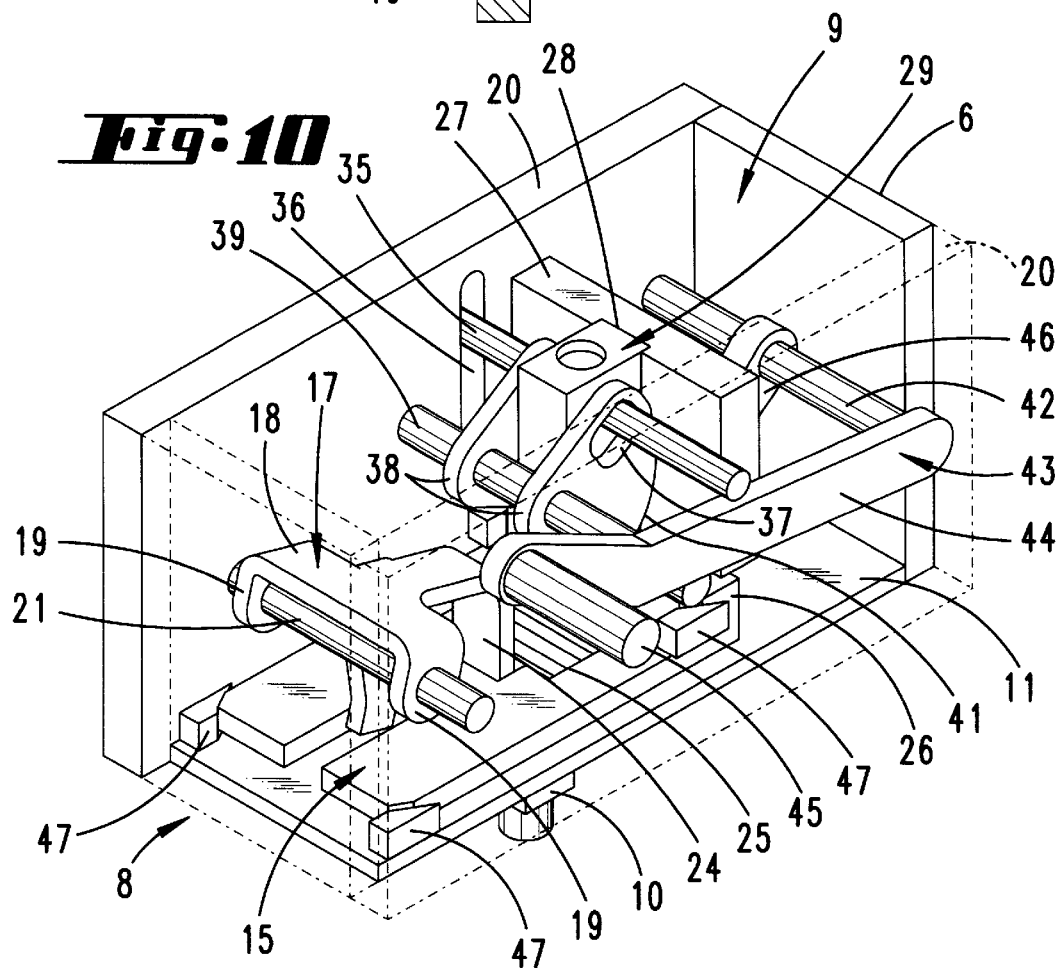
FIG. 10 shows the fastener during opening actuation, in perspective representation.

To remove the vehicle seat 1, the fastener 9 and the locking dog 10 must be separated. This is accomplished by pivoting the actuating arm 44 of the opening lever 43 in the clockwise direction. During this process, the actuating arm 44 acts on the coupling pin 35 and displaces the clamping slide 29 in such a way that the lower end 29' of the latter leaves the capture opening 25. The clamping member/rotary wedge 38 is also pivoted out of engagement by the coupling pin 35. After a delay, the lever arm 46 of the opening lever 43 acts on the supporting beam 26 of the blocking slide 15 and displaces the latter into its release position against the force of the compression springs 16. In the final phase of the displacement of the blocking slide, the angle limb 14 of the trigger 17 can enter the capture opening 25 and fix the latter, thus giving the position in accordance with FIGS. 8 to 10. Centering wedges 47 on the sides of the housing side walls 20 then hold the blocking slide 15 in a position in which the capture opening 25 is in alignment with the entry opening 12 and the locking dog 10.

In the second embodiment in accordance with FIGS. 14 to 22, identical components bear identical reference numerals. The trigger 48 is now configured as a pushbutton which can be displaced in a linear manner. It has a pushbutton pin 49 which is guided in the vertical direction in the fastener housing and is loaded in a downward direction by a compression spring 50. In the release position of the blocking slide 15, the lower end of the pushbutton pin projects slightly above the housing base 11, cf. FIGS. 21 and 22. At its upper end, the pushbutton pin 49 is traversed by a coupling pin 51 which, for its part, interacts with an angled transmission lever 52. The latter is pivoted on a bearing journal 53. The coupling pin 51 can be guided by means of its ends in vertical slots in the housing side walls 20, although this is not illustrated. The lower end of these longitudinal slots which are not shown limits the downward movement of the pushbutton 49. As regards the transmission lever 52, this is an angled lever, one lever arm 52' of which interacts with the coupling pin 51, while the other lever arm 52" acts via a tension spring 54 on the blocking slide 15. According to FIGS. 21 and 22, this tension spring 54 is in the unextended position. As a result, the blocking slide 15 is held in its release position, in which its capture opening 25 is in alignment with the entry opening 12 and with the locking dog 10. In this position, the clamping member 29 is supported on the corresponding broad face of the blocking slide 15. The coupling pin 35 of the clamping member 29 interacts with the opening lever 43. In this version too, a clamping member/rotary wedge as in the first embodiment can be provided.

Figure 21:
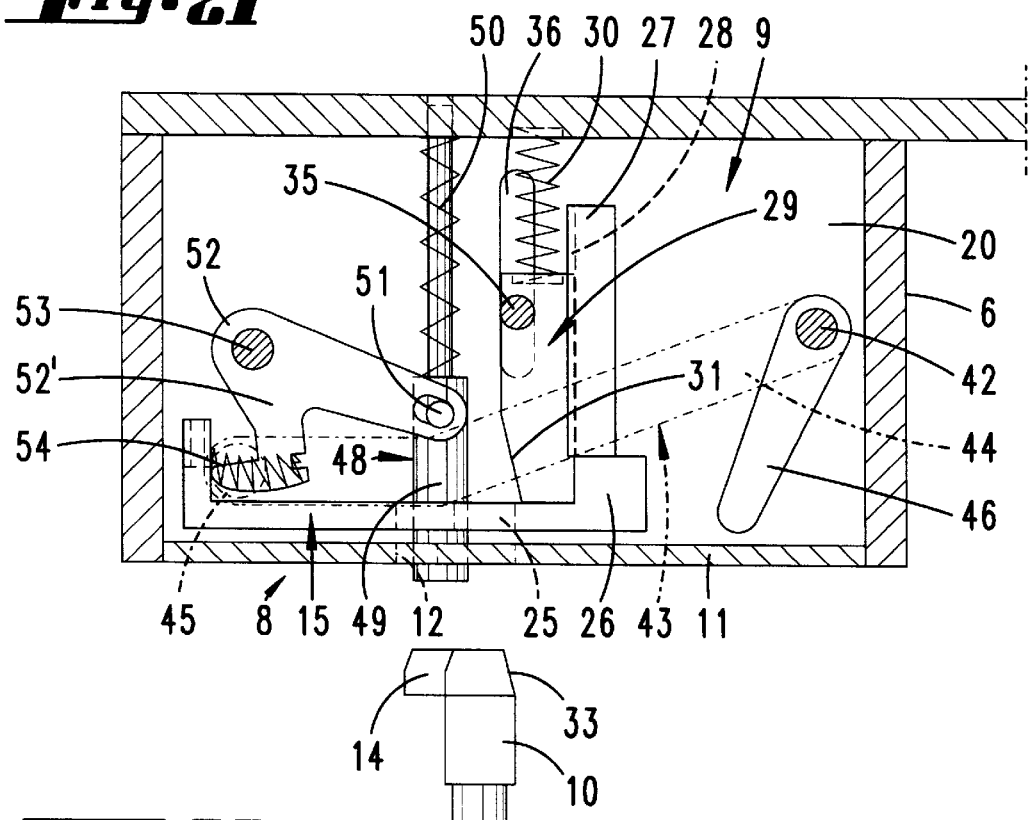
FIG. 21 shows an illustration comparable with FIG. 14 but with the fastener raised from the locking dog.
Figure 22:
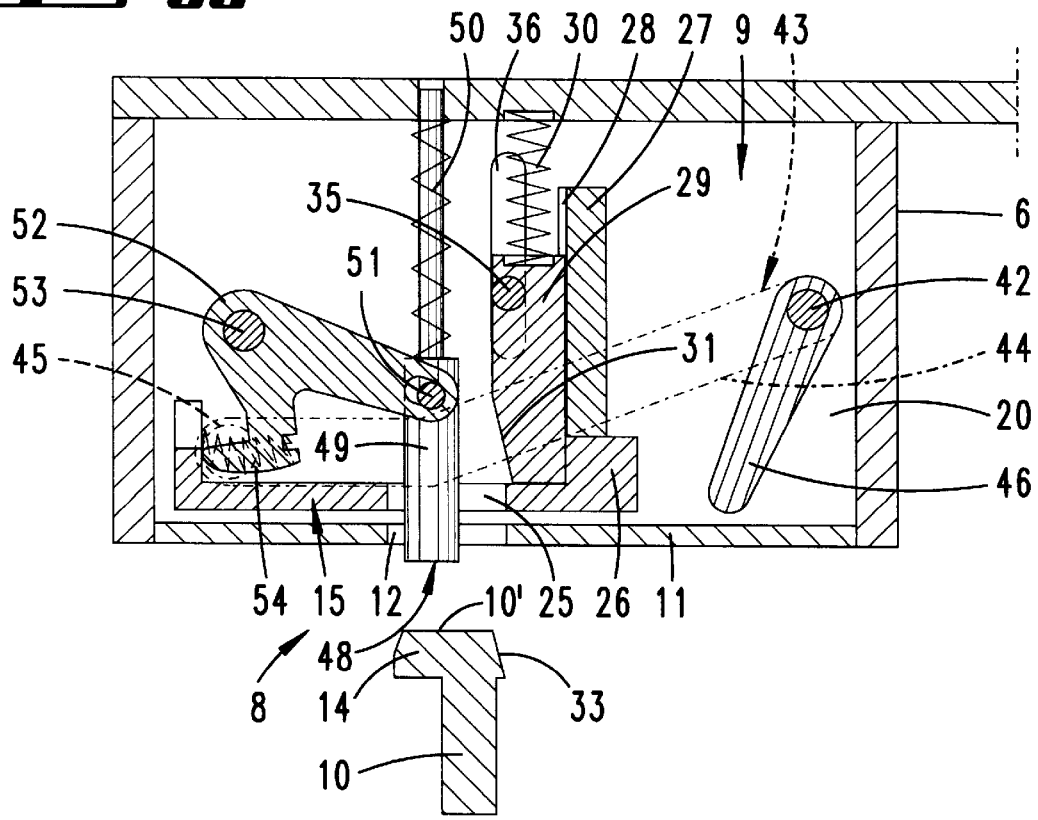
FIG. 22 shows an illustration comparable with FIG. 15, this likewise being the position in which the fastener and the locking dog are separated.

The mode of operation of the fastener in accordance with the second embodiment is as follows: When the rear area of the vehicle seat is placed on, the position in accordance with FIGS. 21 and 22 is obtained. As the vehicle seat is displaced further in the direction of the locking dog 10, the latter acts on the trigger 48 and displaces the latter in the inward direction. As long as the blocking projection 14 is still within the capture opening 25, the blocking slide 15 cannot move. Owing to the actuation of the pushbutton pin 49, concomitant pivoting of the transmission lever 52 in the counterclockwise direction takes place via the latter, with the tension spring 54 being tensioned. As soon as the blocking projection 14 of the locking dog 10 is above the blocking slide 15, a displacement of the blocking slide 15 into the locking position can take place due to the force of the tension spring 54, the clamping member 29 losing its support on the broad face of the blocking slide 15 and moving forward rapidly under spring loading in the direction of the locking dog 10, and its wedging surface 31 coming to rest against the mating surface 33 of the locking dog. A sturdy connection has thus been established between the fastener 9 and the locking dog 10, cf. FIGS. 13 to 16

Figure 18:
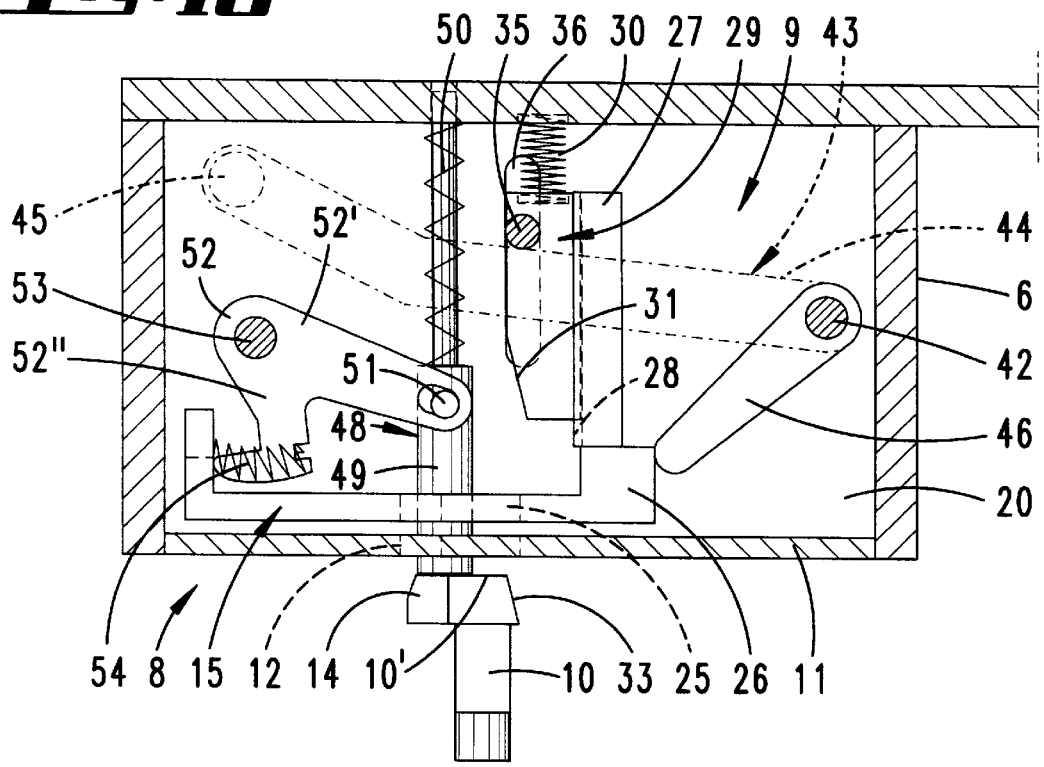
FIG. 18 shows a section comparable with FIG. 14, the opening lever being actuated.
Figure 17:
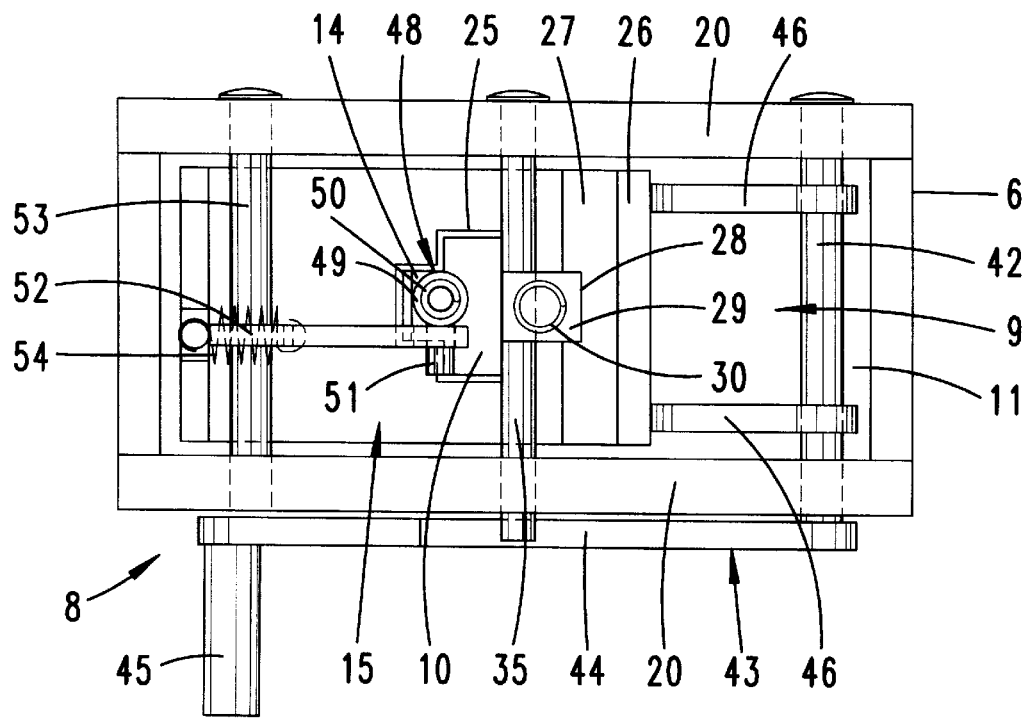
FIG. 17 shows a plan view of the fastener with the opening lever actuated.
Figure 19:
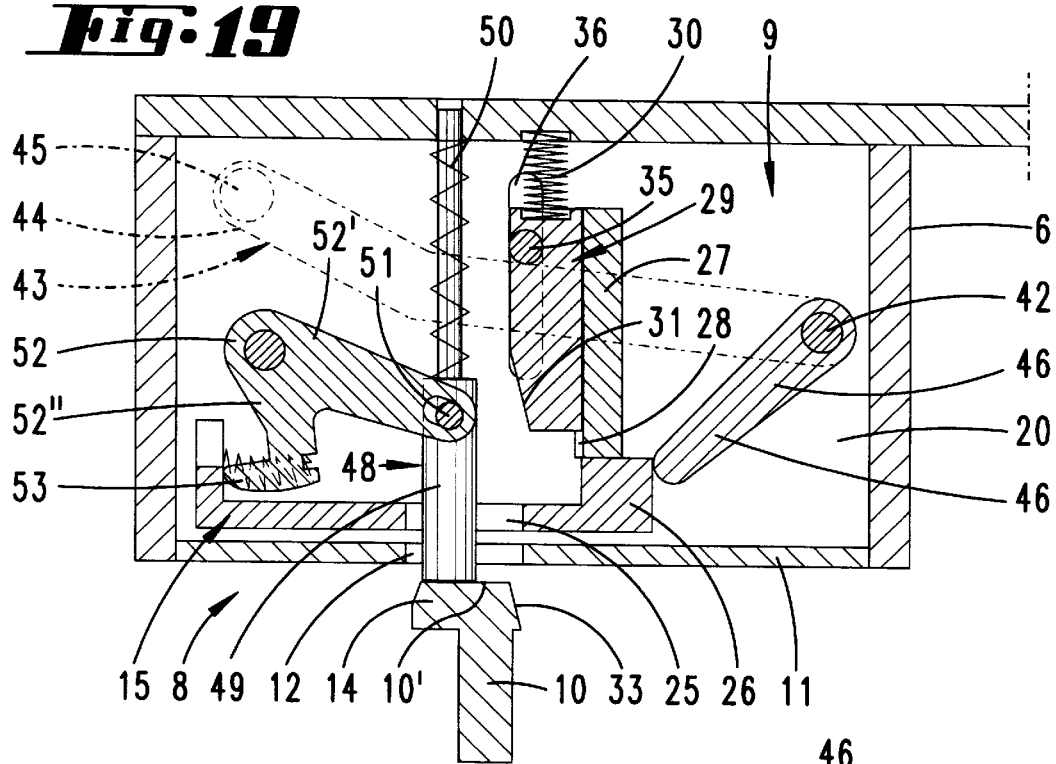
FIG. 19 shows a section comparable with FIG. 15, likewise with the opening lever pivoted.
Figure 20:
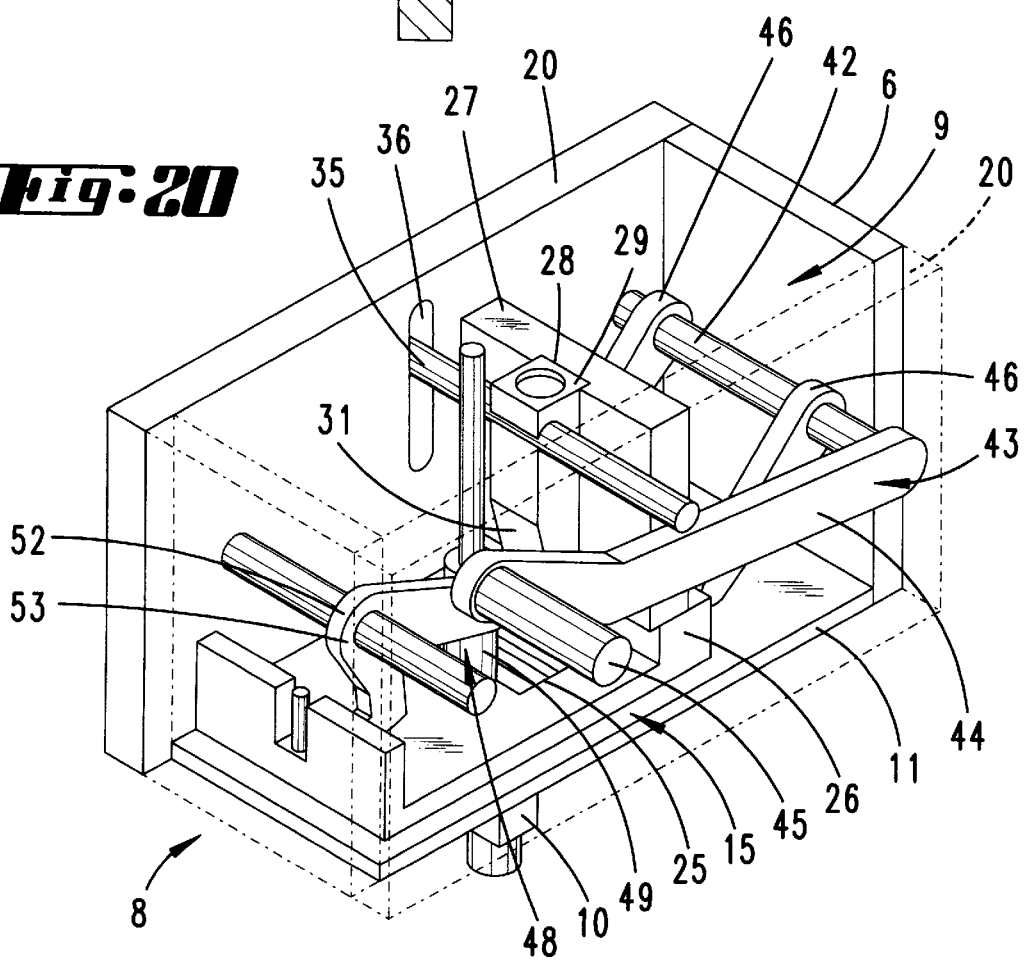
FIG. 20 shows a perspective representation of the fastener with the opening lever pivoted.

To separate the fastener 9 from the locking dog 10, the opening lever 43 must be pivoted into the position shown in FIGS. 18 to 20. During this process, the coupling pin 35 is acted upon and the clamping slide 29 is thus lifted out. After a delay, the lever arm 46 of the opening lever 43 acts on the blocking slide 15 and brings it back into its initial position. The trigger 48 holds the blocking slide 15 in the position shown in FIGS. 18 to 20 by means of the transmission lever 52 and the unextended tension spring 54, with the result that the clamping slide 29 moves back into its position of support on the broad face of the blocking slide 15 when the opening lever 43 is released. The initial position shown in FIGS. 21 and 22 is then re-established.

According to the third embodiment, illustrated in FIGS. 23 to 27, identical components are provided with identical reference numerals. The trigger 55 is now configured as a pivoted lever. Its spindle 56 is noncircular in shape. It has approximately the shape of an elongate rib. The spindle 56 is guided in vertically aligned housing slots 57 in the housing side walls 20. At the upper end, each housing slot 57 opens into a pivoting clearance 58. This makes it possible for the pivoted-lever trigger 55 to pivot in the clockwise direction in accordance with the illustration when the spindle 56 enters.

The pivoted-lever trigger 55 has a driving arm 59 and a feeler arm 60. The driving arm 59 carries a pin 61 which is oriented parallel to the spindle 56 and engages in a driver slot 62 in the blocking slide 15. Said driver slot 62 is situated in an end pedestal 73 of the blocking slide 15, which driver slot 62 is arranged transversely to the direction of displacement of the blocking slide 15. The wall 72 of the driver slot 62 is elastically padded. For this purpose, the wall 72 can be composed of rubber or a corresponding material.

Above the housing slots 57, the housing side walls 20 bear a journal 63 on which a return spring 64 for the pivoted-lever trigger 55 is arranged. The return spring 64 is configured as a torsion spring, one leg 65 acting on the noncircular spindle 56, while the other leg 66 loads the clamping member 29 in the direction of the broad face of the blocking slide 15. In the open position, the lower end face 68 of the clamping member 29 is supported on the upper broad face of the blocking slide 15 on the far side of the capture opening 25, cf. FIG. 23. The clamping member 29 likewise forms a wedging surface 31 for interaction with the likewise oblique mating surface 33 of the locking dog 10. A crossmember 27 extending between the housing side walls 20 serves to guide the clamping member 29.

The blocking projection 14 forms a slope 70 under which an oblique blocking surface 69 of the blocking slide 15 can engage, the slope angle of the blocking surface 69 and of the slope 70 being equal.

The round-ended feeler arm 60, mentioned at the outset, of the pivoted-lever trigger 55 interacts with an oblique end face 71 of the locking dog 10, which oblique end face 71 falls away in the direction of the blocking projection 14.

Finally, an opening lever 43 is also provided in this version, said opening lever having an actuating arm 44 which extends outside the fastener housing, parallel to a side wall 20, and has an actuating handle 45. In terms of its action, the actuating arm 44 is connected to a lever arm 46 which is situated within the fastener housing and, for its part, interacts with a supporting shoulder 26 of the blocking slide 15.

Figure 23:
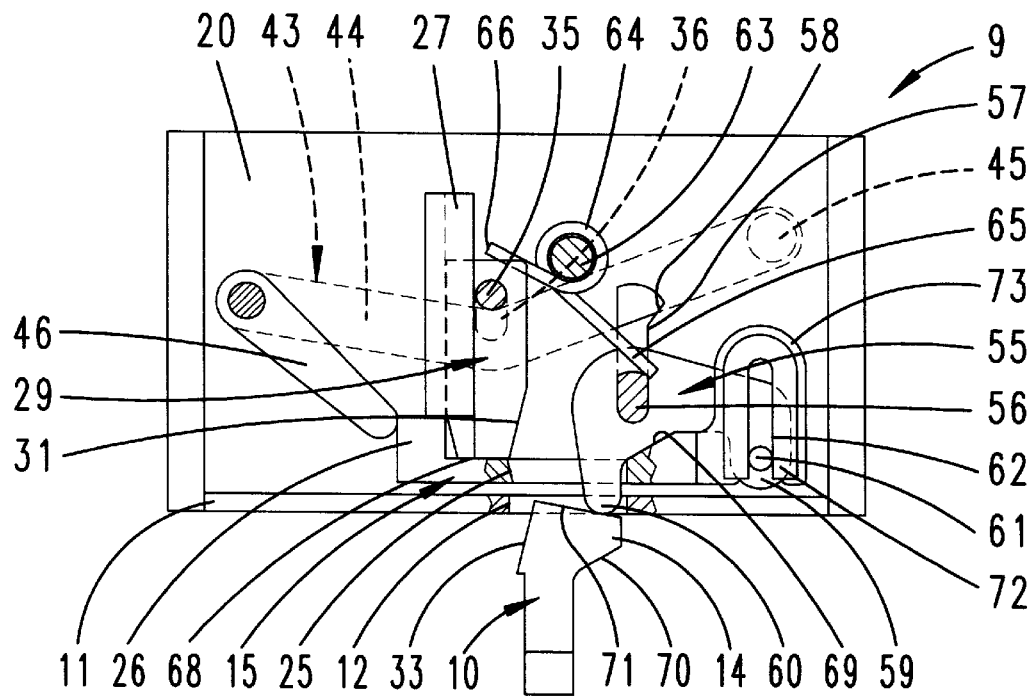
FIG. 23 shows the section along the line XXIII—XXIII in FIG. 24 relating to the open position of the fastener.
Figure 24:
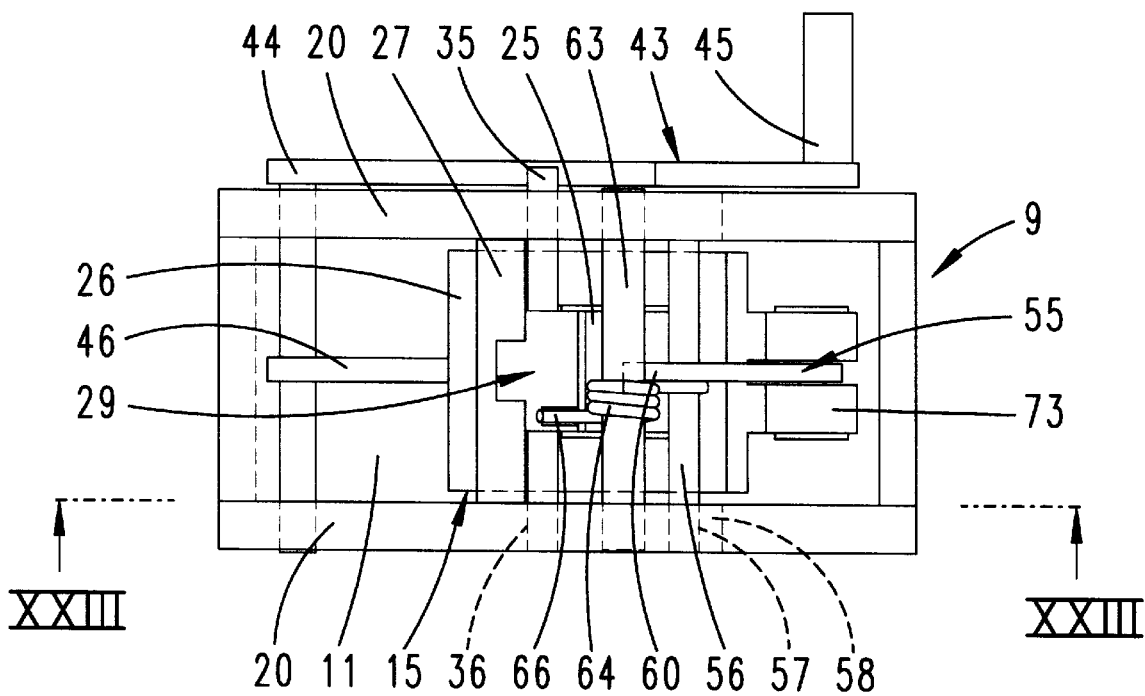
FIG. 24 shows the plan view of FIG. 23.
Figure 25:
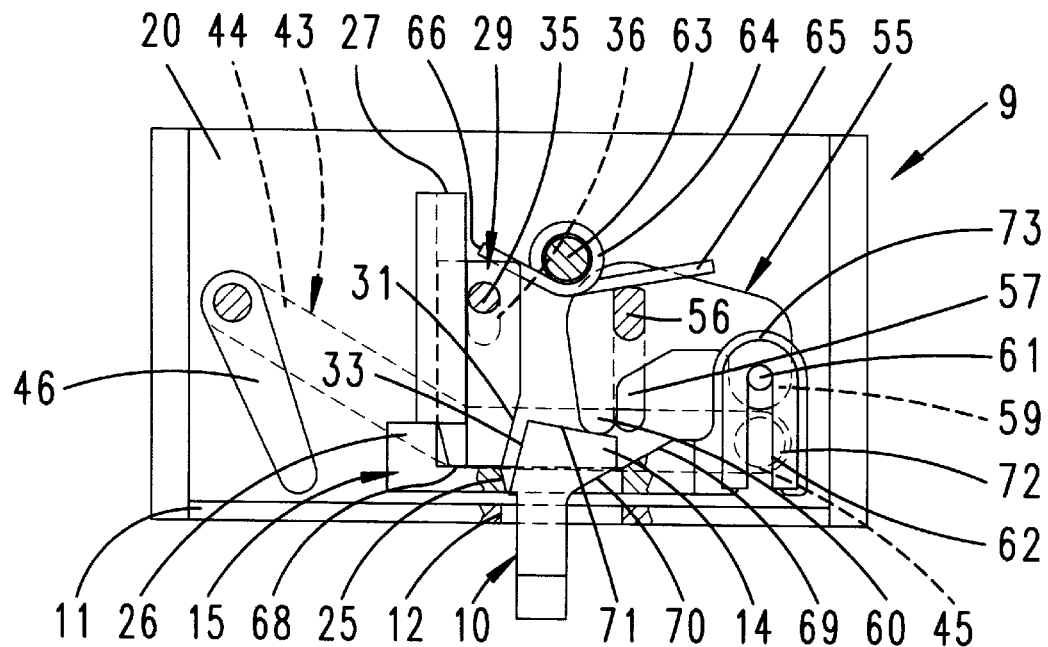
FIG. 25 shows an illustration corresponding to FIG. 23 but during the closing operation.
Figure 26:
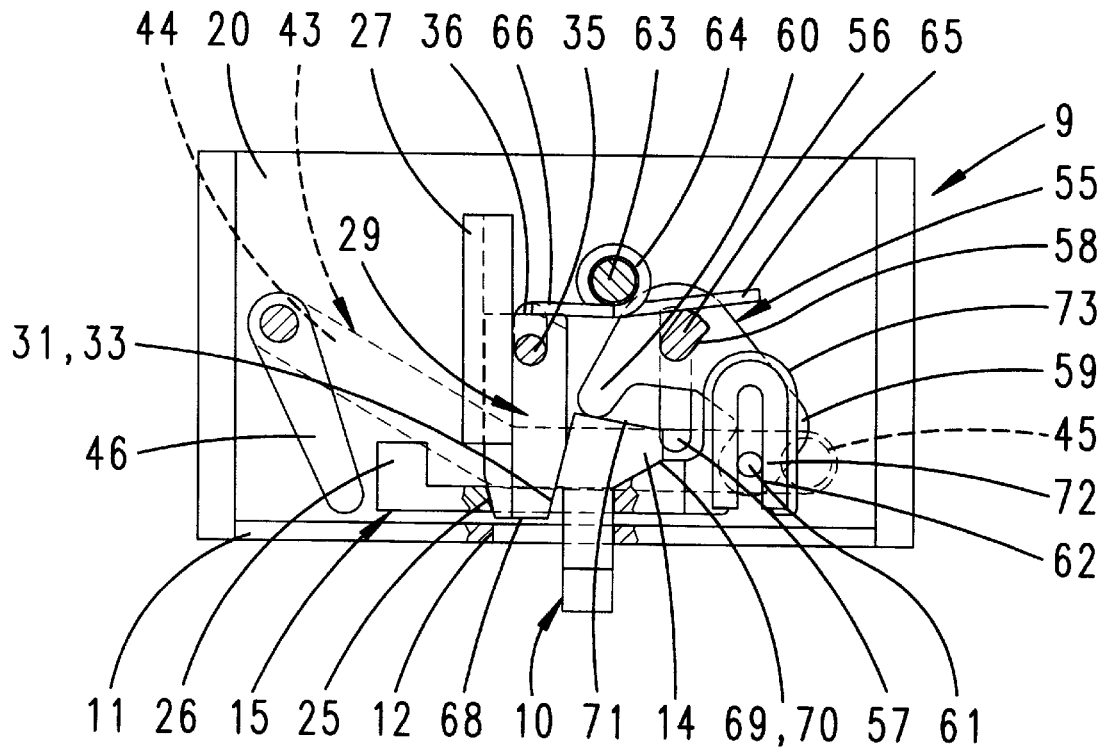
FIG. 26 shows the follow-up illustration to FIG. 25, relating namely to the locking position.
Figure 27:
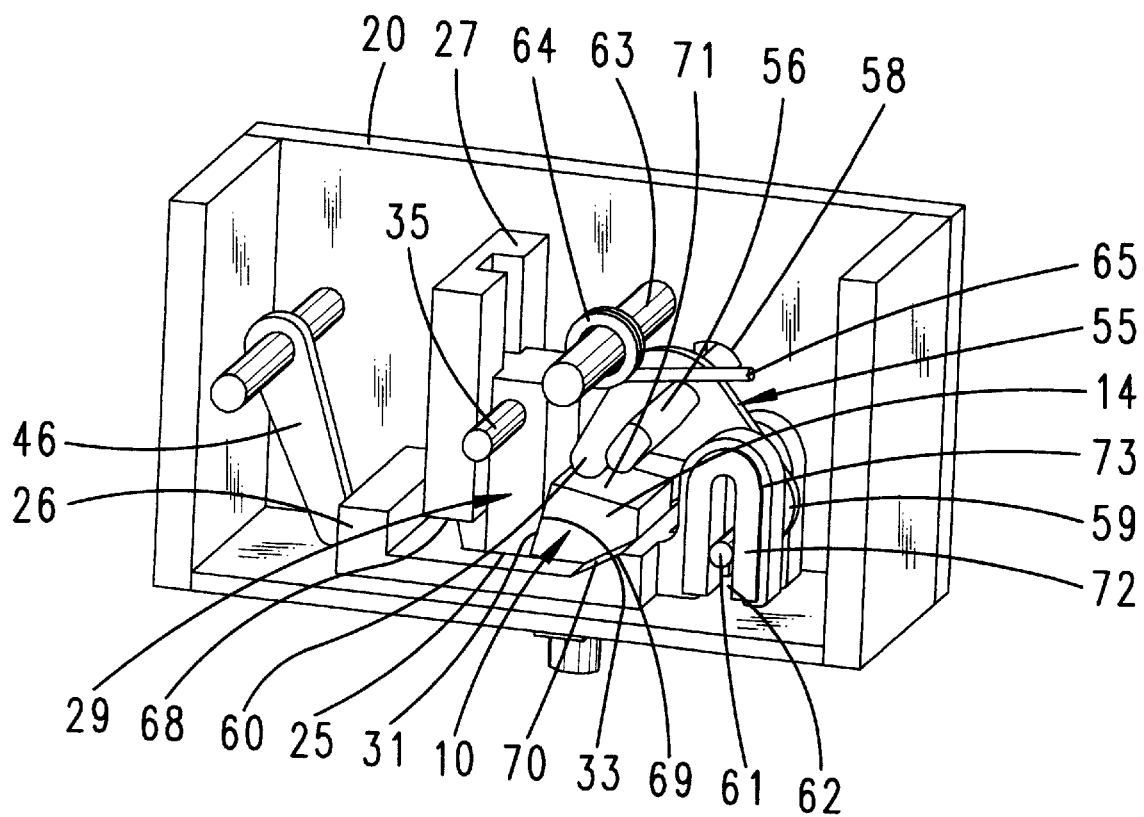
FIG. 27 shows the fastener in perspective representation in the locking position.

In the open position in accordance with FIG. 23, the spindle 56 is at the lower end of the housing slots 57. The pivoted-lever trigger 55 here holds the blocking slide 15 in a position in which the locking dog is in alignment with the capture opening 25 of the blocking slide 15. The locking dog 10 is likewise in a position of alignment with the entry opening 12 in the housing base 11.

This fastening device operates as follows:

When the vehicle seat is placed on, the locking dog 10 first of all acts on the feeler arm 60 of the pivoted-lever trigger 55 by means of its obliquely extending end face 71.

At the same time, the blocking dog 10 passes through the entry opening 12 and then the capture opening 25. Thanks to the housing slots 57, the pivoted-lever trigger 55 is concomitantly displaced in the same direction as the entry movement, cf. FIG. 25. The noncircular configuration of the spindle 56 prevents the trigger 55 from pivoting. Here, displacement takes place against the force of the return spring 64. After passing through the relevant free travel without being able to take the blocking slide 15 along in the process, the spindle 56 enters the pivoting clearance 55, with the result that the trigger 55 can pivot by virtue of the actuation by the locking dog 10, and this is associated with taking along of the blocking slide 15 into the locking position shown in FIGS. 26 and 27. During this process, the oblique blocking surface 69 of the blocking slide 15 engages under the facing slope 70 of the blocking projection 14. The clamping member 29 has furthermore lost its end support on the blocking slide 15, with the result that the torsion spring 64 displaces the clamping member 29 in the downward direction, the wedging surface 31 of the latter acting on the mating surface 33 of the locking dog 10, the latter thus being flanked by wedging surfaces in the direction of displacement of the slide. By means of the elastic wall 72, it is furthermore possible to achieve a tightening effect which, in addition to compensating for installation tolerances, leads to a rattle-free connection between the locking dog 10 and the fastener 9.

To release the locking, it is necessary to displace the opening lever 43 by means of the actuating handle 45, the actuating arm 44 acting on the coupling pin 35 guided in vertical slots 36 and displacing it in an upward direction, the clamping member 29 moving out of its position of engagement. The trigger 55 pivots concomitantly, its spindle 56 passing through the housing slot 57 and returning to the initial position. In conjunction with the pivoting of the trigger 55, the blocking slide 15 is displaced back into its release position in accordance with FIGS. 23 and 24.

What is claimed is:

1. A fastening device for seats (1), seat benches or the like on a floor (13) of a motor vehicle or the like, with a floor-mounted locking dog (10) with a blocking projection (14) spaced apart from the floor and with a fastener (9), having a blocking slide (15) with a capture opening (25) for the locking dog (10), which blocking slide (15) is displacable, in a manner controlled by a trigger (17, 48, 55), out of an open position into a fastening position, in which it engages under the blocking projection by opening edge (25"), and a clamping member (29) which, in the fastening position, enters the displaced said capture opening (25) and wedges against the locking dog (10).

2. The fastening device as claimed in claim 1, wherein the clamping member (29) forms a wedging surface (31).

3. The fastening device as claimed in claim 1, wherein wedging portion (29') of the clamping member (29) is plastic-coated and the mating surface (33) of the locking dog (10) forms toothing (34) that extends in direction of displacement.

4. The fastening device as claimed in claim 1, wherein the clamping member (29) enters the capture opening (25) under spring loading.

5. The fastening device as claimed in claim 1, wherein the clamping member (29) is supported on a broad face of the blocking slide (15) in the open position.

6. The fastening device as claimed in claim 1, wherein the clamping member (29) is dragable out of its clamping position by a pivotable opening lever (43), the pivoting of which effects displacement of the blocking slide (15) back into the open position.

7. The fastening device as claimed in claim 1, wherein the clamping member (29) is constructed as a clamping slide.

8. The fastening device as claimed in claim 1, wherein the trigger (17, 48, 55) senses an end face (10') of the locking dog (10).

9. A fastening device for seats, seat benches or the like on a floor (13) of a motor vehicle or the like, with a floor-mounted locking dog (10) with a blocking projection (14) spaced apart from the floor and with a fastener (9), having a blocking slide (15) with a capture opening (25) for the locking dog (10), which blocking slide (15) is displaceable, in a manner controlled by a trigger (17, 48), out of an open position into a fastening position, in which it engages under the blocking projection by an opening edge (25"), a clamping member (38) which moves up against an end face (10') in the fastening position and wedges between a fastening housing and the end side (10') of the locking dog.

10. The fastening device as claimed in claim 9, wherein the clamping member (38) is a rotary wedge.

11. The fastening device as claimed in claim 10, wherein the rotary wedge (38) is displaced back out of the clamping position together with a clamping slide (29) during opening actuation.

12. The fastening device as claimed in claim 11, further comprising a coupling pin (35) of the clamping slide (29), which coupling pin (35) projects with clearance through a driver opening (37) in the rotary wedge (38) and is dragged along by an opening lever (43) during the opening actuation.

13. The fastening device as claimed in claim 1, wherein the blocking slide (15) is displaceable into its open position by a lever arm (46) of the opening lever (43).

14. The fastening device as claimed in claim 1, wherein the blocking slide (15) is held in the open position by the trigger (17, 48) in a latching position.

15. The fastening device as claimed in claim 1, wherein the trigger (48) is a feeler (49).

16. The fastening device as claimed in claim 1, wherein the trigger (17, 55) is a pivoted lever.

17. The fastening device as claimed in claim 1, wherein the trigger (17) holds the blocking slide (15) in the open position by engagement in the capture opening (25).

18. The fastening device as claimed in claim 1, wherein the trigger (48) tensions a blocking-slide displacement spring (54) during its displacement under action of an end face (10') of the locking dog (10).

19. The fastening device as claimed in claim 1, wherein the blocking slide (15) is displaced forcibly into a blocking position by the entry movement of the locking dog (10) into the capture opening (25).

20. The fastening device as claimed in claim 1, wherein forcible displacement of the trigger (55), which passes through a free travel, is controlled.

21. The fastening device as claimed in claim 1, wherein the trigger (55) is a pivoted lever, said trigger travels freely in the same direction as the entry movement of the locking dog while its spindle (56) is guided in a rotation-inhibited manner in a housing slot (57) which, at an end, forms a pivoting clearance (58), wherein a driving arm (59) of the pivoted lever (55) displaces the blocking slide (15) into its blocking position.

22. The fastening device as claimed in claim 21, wherein the driving arm (59) has a pin (61) which engages in a driver slot (62) extending transversely to the direction of displacement of the blocking slide (15).

23. The fastening device according to claim 22, wherein there is elastic transverse support of the pin (61) in the driver slot (62).

24. The fastening device as claimed in claim 22, wherein a wall (72) of the driver slot (62) is elastically padded.

25. The fastening device as claimed in claim 1, wherein linear displacement is performed against the force of a return spring (64).

26. The fastening device as claimed in claim 25, wherein the return spring (64) loads a clamping member (29).

27. The fastening device as claimed in claim 1, wherein the blocking projection (14) forms a slope (70), and wherein an oblique blocking surface (69) of the blocking slide (15) is engagable under said slope.

28. The fastening device as claimed in claim 1, wherein the blocking slide (15) is displaced back into the open position as a result of the force of a return spring (64) acting on the trigger (55).

29. The fastening device as claimed in claim 1, wherein for pivoting displacement, a feeler arm (60) formed by a trigger lever (55) slides on an oblique end face (71) of the locking dog (10).

30. The fastening device as claimed in claim 28, wherein the return spring (64) is a torsion spring, one leg (65) of which acts on a noncircular spindle (56) and the other leg (66) of which acts on the clamping member (29).

\* \* \* \* \*